UNITED STATES PATENT OFFICE.

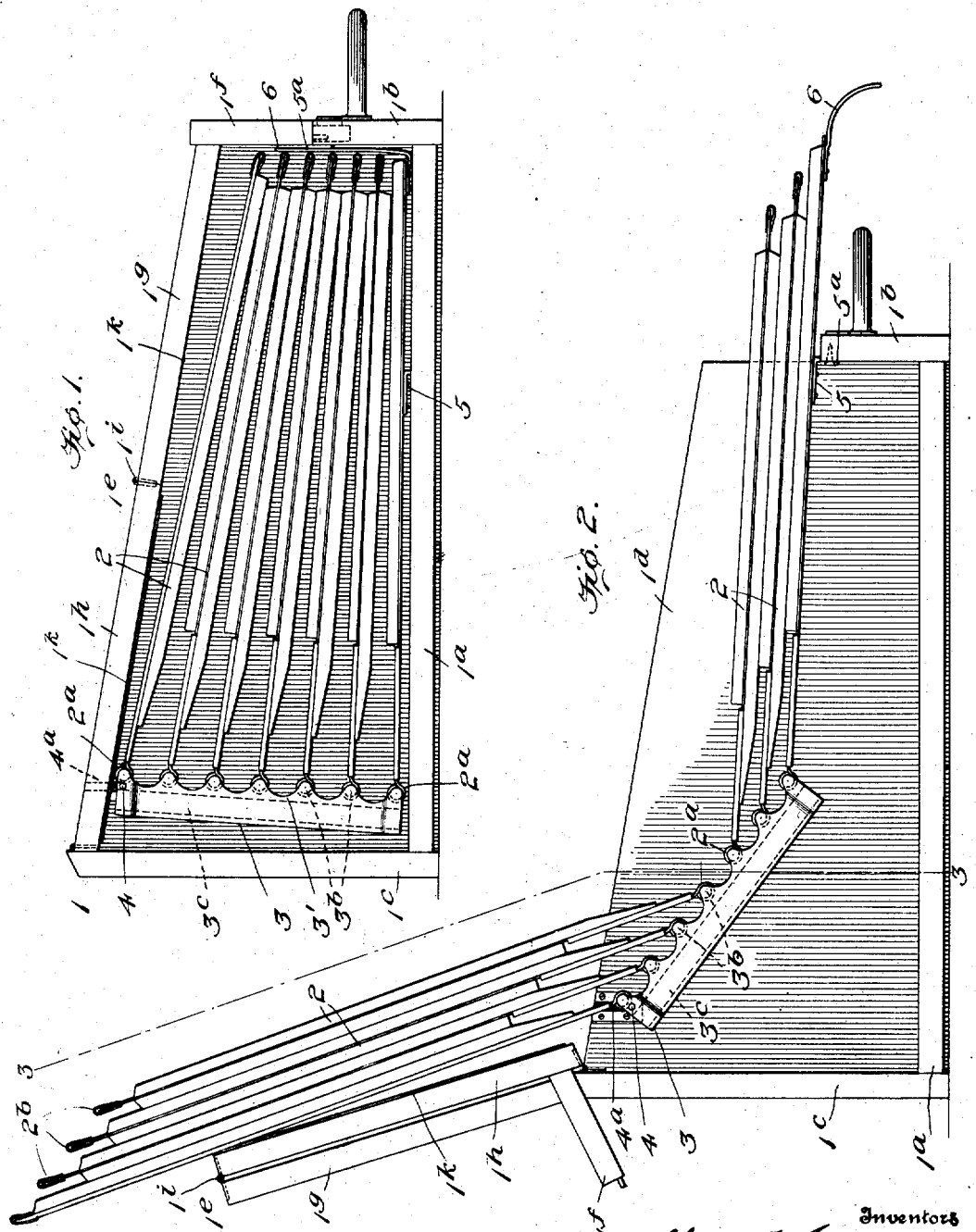

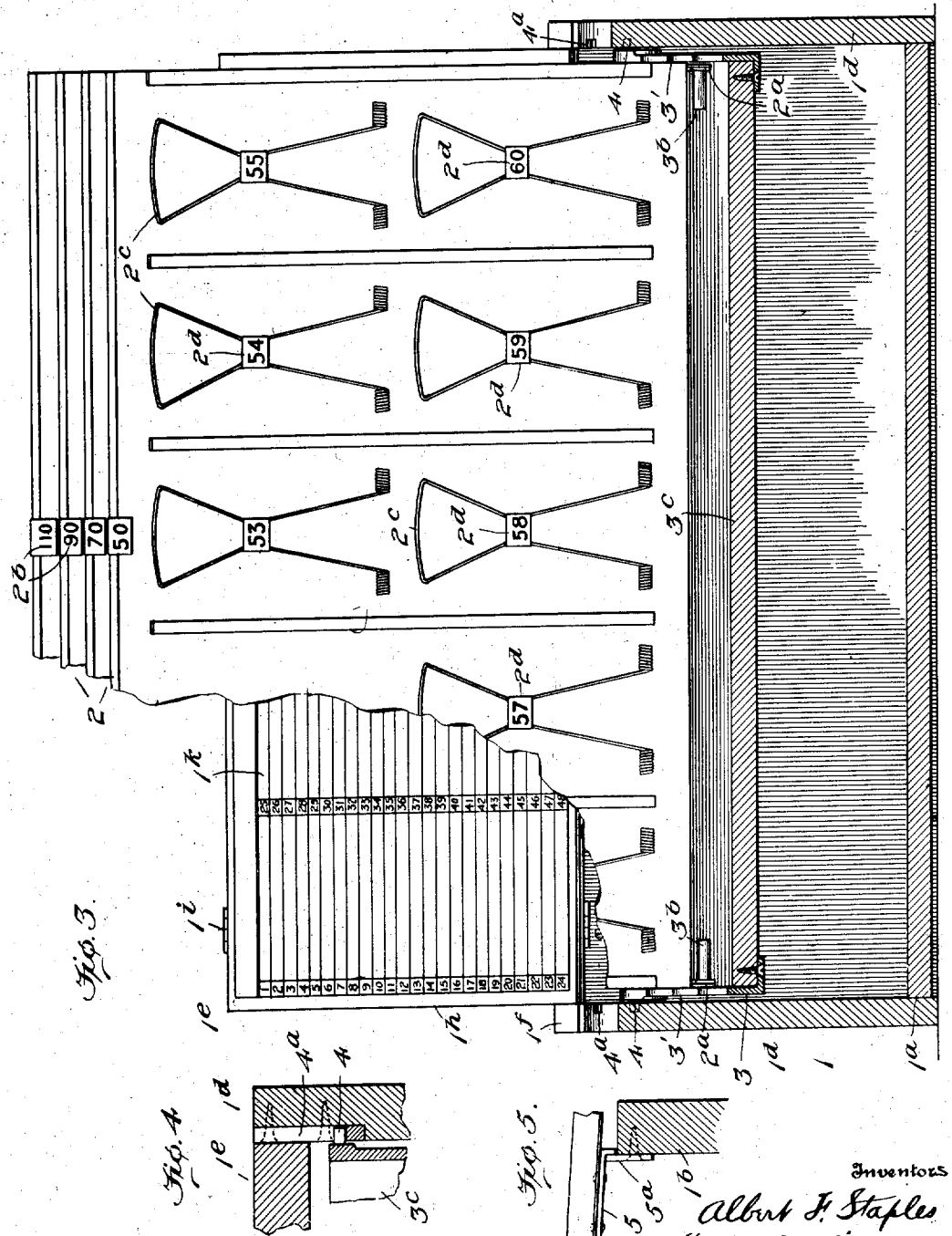

ALBERT F. STAPLES AND HARRY J. HICK, OF ALLIANCE, OHIO, ASSIGNORS TO THE McCASKEY REGISTER COMPANY, OF ALLIANCE, OHIO, A CORPORATION OF OHIO.

FILING APPLIANCE.

1,051,463. Specification of Letters Patent. Patented Jan. 28, 1913.

Application filed August 11, 1909. Serial No. 512,412.

*To all whom it may concern:*

Be it known that we, ALBERT F. STAPLES and HARRY J. HICK, citizens of the United States, residing at Alliance, in the county of Stark and State of Ohio, have invented certain new and useful Improvements in and Relating to Filing Appliances, of which the following is a specification.

This invention relates to a filing appliance.

The invention consists of a set of leaves and a swingable base on which each of the leaves are pivotally mounted.

The invention further consists of a casing or housing, a base swingingly mounted within the casing or housing adapted to normally lie in a substantially vertical position, and to be swung into an inclined or operative position, and a series of paper or slip-holding leaves each pivotally mounted upon the base, whereby when the base is in a substantially vertical position the leaves will be superposed or in rectangular arrangement within the casing and when the base is in inclined position, the leaves may be moved from a substantially horizontal position to a substantially vertical position.

The invention also consists in the combination or combinations of parts hereinafter described.

For the purpose of illustration we have, in the accompanying drawings, shown and herein described one form of apparatus embodying our invention.

Referring to the drawings Figure 1 is a side elevation of a filing appliance embodying our invention, one side of the case being removed. Fig. 2 is a side elevation of the filing appliance, the casing being open, and the leaves being arranged in operative position. Fig. 3 is a vertical sectional view on the line 3—3 of Fig. 2. Figs. 4 and 5 are detail views.

In the drawings, 1 indicates a casing or housing that may be constructed in any well known manner. Said casing or housing preferably comprises a bottom $1^a$, a front $1^b$, a back $1^c$, sides $1^d$, $1^d$, and a cover or door $1^e$, hinged along its rear edge to the back $1^c$.

2 indicates a series of paper or slip-holding leaves, each pivotally mounted, preferably at or near its opposite inner or lower ends, upon a base or support 3. The base 3 preferably comprises a pair of plates $3'$ carrying a series of pivot pins $3^b$, on which suitable straps or loops $2^a$ carried by each leaf 2, rotates, these parts, that is, the pivot pins $3^b$, and the loops $2^a$, forming the pivoting means or devices for the leaves. The plates $3'$ are rigidly supported relatively to each other, preferably by a connecting plate $3^c$.

The base 3 is swingably mounted within the casing or housing 1, whereby the leaves 2 may be collapsed or arranged in a rectangular pack within the casing or housing 1, or arranged in an operative position, as shown in Fig. 2, adapted to be moved from a substantially horizontal position to a substantially vertical position, or vice versa, with their upper or free edges in stepped relationship relatively to each other. The casing or housing is constructed of a size so that when the leaves are collapsed they fit closely therein. The means for swingably mounting the base 3 within the casing 1, preferably comprise pins 4 extending laterally from its opposite ends at or near its rear edge, and a pair of supports $4^a$, one of which is mounted upon the inner face of each of the sides $1^d$. The supports $4^a$ are constructed to permit the pins 4 to be detached therefrom and the entire set of leaves removed from the casing 1, when desired.

5 indicates the lock or catch carried by the frontmost leaf of the set of leaves 2 and adapted to engage with a projection or hook $5^a$ carried by the front $1^b$.

6 indicates a strap or handle pivotally mounted at or near the free edge of the frontmost leaf of the series of leaves 2, whereby the leaves may be readily removed from within the casing 1 into an operative position, as shown in Fig. 2. When the leaves are collapsed within the casing, the handle 6 folds up, as shown in Fig. 1, with its free end extending slightly above the upper edge of the front $1^b$, so that the leaves may be raised vertically and the base 3 swung into inclined or operative position.

When the base 3 is swung into its inclined position, it will be understood that each of the leaves 2 may be swung from a substantially horizontal position to a substantially vertical position, one by one, and vice versa, and when the leaves are in their horizontal or vertical positions, the free edges of the said leaves will be in stepped relationship to expose an index tab $2^b$ carried thereby. $2^c$ indicates paper or slip-holding devices, preferably comprising spring clips mounted upon one or both faces of each of the leaves 2. Each of the paper or slip-holding devices may be provided with a suitable display or signal-carrying device 2ᵈ.

As shown in the drawings, the lock 5 carried by the frontmost leaf of the set of leaves 2, is so positioned on the said leaf that when it engages with the projection 5ᵃ the base 3 will be inclined at an angle of substantially forty-five degrees. By this construction and operation, it will be seen that the leaves when swung downwardly, will each occupy substantially a horizontal position. The cover 1ᵉ is provided with a front plate 1ᶠ adapted to occupy the space between the upper edge of the front 1ᵇ and the upper edges of the sides 1ᵈ, so that when the cover 1ᵉ is swung downwardly on its hinges, the front plate 1ᶠ will coöperate with the front 1ᵇ to inclose entirely the set of leaves 2.

When the cover 1ᵉ is swung upwardly, it operates as a stop or rest for the leaves 2 when they are swung into a substantially vertical position.

The top 1ᵉ is preferably formed of two parts or members, 1ᵍ, 1ʰ, hinged together at 1ⁱ, and adapted to be folded one upon the other to facilitate the opening of the casing 1.

The inner face of the cover member 1ʰ, is preferably provided with an index-carrying sheet 1ᵏ.

When it is desired to move the leaves 2 into an operative position, the handle 6 is grasped and the leaves slightly moved on their pivots until the free edge of the frontmost leaf, which is the lowermost leaf when the leaves are inclosed within the casing, is shown above the top edge of the front 1ᵇ. By then pulling the frontmost leaf forwardly until the lock 5 engages the projection or hook 5ᵃ, the base 3 will be inclined at an angle of substantially forty-five degrees. When the base is in this latter position, the leaves will be supported in both the horizontal and vertical positions with their free ends in stepped relationship to each other. Such arrangement permits the leaves to be readily swung upwardly from a substantially horizontal position to a substantially vertical position and back again, one by one. When it is desired to close the leaves within the casing, the handle 6 is again grasped and the frontmost leaf is slightly raised until the lock 5 disengages the hook 5ᵃ. The base will then swing downwardly into a substantially vertical position under the influence of gravity, the leaves sliding backwardly and downwardly within the casing in a manner opposite to the operation of raising them.

If desired, the casing 1 may be provided with suitable locking means for locking the cover 1ᵉ in closed position, and it may also be provided with a suitable handle so that the casing, with the leaves inclosed therein, may be transported from place to place.

To those skilled in the art of making articles of the class described, many alterations in construction and widely differing embodiments and applications of our invention will suggest themselves, without departing from the spirit and scope thereof.

Our disclosures and the description herein are purely illustrative and are not intended to be in any sense limiting.

What we claim is—

1. In a filing appliance, the combination of a support, a base normally supported in vertical position on pivots arranged at or near its upper end, a series of leaves of uniform size normally arranged in horizontal superposed position and pivotally connected at one end to said base, and means for supporting the base in inclined position with the free edges of the leaves in stepped relationship.

2. In a filing appliance, the combination of a casing, a base, a series of leaves of uniform size pivotally connected to the base, the said base being normally arranged in vertical position and pivotally mounted in the casing at its upper end, and supporting the leaves in a rectangular pack, and means for swinging the base into an inclined position to support the leaves in operative position with their free edges in stepped relationship.

3. In a filing appliance, the combination of a support, a base normally arranged in a vertical position, a series of paper holding leaves pivotally mounted upon the said base, the pivots for the leaves being arranged in the same plane, means permitting the base to swing from a substantially vertical position to an inclined position, the leaves being arranged in a rectangular pack when the base is in a substantially vertical position and the free edges of the leaves being arranged in stepped relationship when the base is inclined and adapted to swing from a substantially horizontal position to a substantially vertical position, and means for supporting the base in an inclined position.

4. In a filing appliance, the combination of a support, a base, means for swingably mounting the base on said support and permitting it to swing from a substantially vertical position to an inclined position and vice versa, a series of paper holding leaves each pivotally mounted upon the said base, means for supporting said base in inclined position and means for inclining the base and arranging the leaves in stepped relationship.

5. In a filing appliance, the combination of a support, a base swingably mounted upon the support and adapted to be moved from a substantially vertical position to an inclined position and vice versa, a series of paper holding leaves each pivotally mounted upon the said base, means for supporting said base in inclined position, and means carried by the front leaf for inclining the base and arranging the leaves in stepped relationship.

6. In a filing appliance, the combination with a support, a base, means for pivoting the said base to the support at or near its rear edge, the said pivoting means permitting the base to be moved from a substantially vertical position to an inclined position and vice versa, a series of leaves pivotally mounted upon the said base; and means carried by the frontmost leaf of the series of leaves and coöperating with said support for supporting the said base in an inclined position, all of the leaves, except the frontmost leaf, being adapted to swing from a substantially horizontal position to a substantially vertical position and vice versa when the said base is inclined.

7. In a filing appliance, the combination of a casing including opposite side pieces, the latter being provided with supports, a base swingably mounted upon the said supports and adapted to be moved from a substantially vertical position to an inclined position, a series of leaves each pivotally mounted upon the said base, the leaves being arranged in compact form when the base is in a substantially vertical position and arranged in stepped relationship when the base is inclined, and means carried, respectively, by one of the leaves and the said casing, coöperating with each other to support the base in an inclined position.

8. In a filing appliance, the combination of a casing comprising a front and side pieces, the said side pieces being provided with supports, a base swingably mounted upon the said supports and adapted to be moved from a substantially vertical position to an inclined position, a series of leaves each pivotally mounted upon the said base, the leaves being arranged in compact form when the base is in a substantially vertical position and arranged in stepped relationship when the base is inclined, and means carried, respectively, by one of the leaves and the said front of the casing, coöperating with each other to support the base in an inclined position.

9. In a filing appliance, the combination of a casing comprising a front and side pieces, the said side pieces being provided with supports, a base swingably mounted upon the said supports and adapted to be moved from a substantially vertical position to an inclined position, a series of leaves pivotally mounted upon the said base, the leaves being arranged in compact form when the base is in a substantially vertical position and arranged in stepped relationship when the base is inclined, and means carried, respectively, by the frontmost leaf of the series of leaves, and the said front of the casing, coöperating with each other to support the base in inclined position.

10. In a filing appliance, the combination of a casing, a base swingably mounted in the casing and arranged to be moved from a substantially vertical position into an inclined position and vice versa, a series of leaves pivotally mounted upon the said base, the said leaves being arranged in a rectangular pack when the base is in a substantially vertical position, and arranged in stepped relationship when the base is inclined, and means carried by the frontmost leaf of the series of leaves for raising the free edges of the leaves to permit the said base to be inclined.

11. The combination of a base, a series of leaves pivotally connected thereto, means for pivotally supporting the base at or near its upper end to permit the base and leaves to swing downwardly by gravity with the leaves arranged in a rectangular pack, a catch device carried by the leaf connected to the base at the end opposite to its pivotal supporting means, and means arranged to be engaged by the said catch device for supporting the base in an operative position.

12. The combination of a support, a base, a series of leaves pivotally connected to the base, and normally arranged in superposed position, means for pivotally supporting the lowermost leaf in a horizontal elevated position with the base inclined and the free edges of the leaves arranged in stepped relationship, the said lowermost leaf operating, when the leaves are in operative position as a horizontal support or rest for the remaining leaves.

13. The combination of a casing, a base, a series of leaves pivotally connected to the base and normally arranged within the casing, pivotal supporting connections between the upper end of the base and the casing, and engaging devices between the lowermost leaf of the series and the casing coöperating with the base pivotal supporting connections to support the base in an inclined position.

14. The combination of a casing, a base, a series of leaves pivotally connected to the base and normally arranged within the casing, pivotal supporting connections between the upper end of the base and the casing, engaging devices between the lowermost leaf of the series and the casing coöperating with the base pivotal supporting connections to support the base in an inclined position, and means for moving the base and leaves into operative position.

15. In combination with a casing provided with a pair of supports each formed with a slot, of a frame provided with a laterally projecting pivot pin at each side arranged within the adjacent slot and swingably supporting the said frame relative to the casing, a series of leaves of uniform size supported on the frame and arranged to lie in a rectangular pack within the casing, and means operating through one of the leaves to support the frame in an inclined position, one end of the slots being open to permit the removal of the leaves and frame from the casing.

In witness whereof we affix our signatures in the presence of two witnesses.

ALBERT F. STAPLES.
HARRY J. HICK.

Witnesses to the signature of Albert F. Staples:
GEO. C. RUSSELL.
F. E. HENRY, Jr.

Witnesses to the signature of Harry J. Hick:
JOHN D. CATHON,
F. C. URAN.

Copies of this patent may be obtained for five cents each, by addressing the "Commissioner of Patents, Washington, D. C."

Correction in Letters Patent No. 1,051,463.

It is hereby certified that in Letters Patent No. 1,051,463, granted January 28, 1913, upon the application of Albert F. Staples and Harry J. Hick, of Alliance, Ohio, for an improvement in "Filing Appliances," an error appears in the printed specification requiring correction as follows: Page 2, line 41, strike out the word "shown"; and that the said Letters Patent should be read with this correction therein that the same may conform to the record of the case in the Patent Office.

Signed and sealed this 25th day of February, A. D., 1913.

[SEAL.]

C. C. BILLINGS,
*Acting Commissioner of Patents.* vided with a pair of supports each formed with a slot, of a frame provided with a laterally projecting pivot pin at each side arranged within the adjacent slot and swingably supporting the said frame relative to the casing, a series of leaves of uniform size supported on the frame and arranged to lie in a rectangular pack within the casing, and means operating through one of the leaves to support the frame in an inclined position, one end of the slots being open to permit the removal of the leaves and frame from the casing.

In witness whereof we affix our signatures in the presence of two witnesses.

ALBERT F. STAPLES.
HARRY J. HICK.

Witnesses to the signature of Albert F. Staples:
Geo. C. Russell.
F. E. Henry, Jr.

Witnesses to the signature of Harry J. Hick:
John D. Cathon,
F. C. Uran.

Copies of this patent may be obtained for five cents each, by addressing the "Commissioner of Patents, Washington, D. C."

---

Correction in Letters Patent No. 1,051,463.

It is hereby certified that in Letters Patent No. 1,051,463, granted January 28, 1913, upon the application of Albert F. Staples and Harry J. Hick, of Alliance, Ohio, for an improvement in "Filing Appliances," an error appears in the printed specification requiring correction as follows: Page 2, line 41, strike out the word "shown"; and that the said Letters Patent should be read with this correction therein that the same may conform to the record of the case in the Patent Office.

Signed and sealed this 25th day of February, A. D., 1913.

[SEAL.]

C. C. BILLINGS,
*Acting Commissioner of Patents.*

It is hereby certified that in Letters Patent No. 1,051,463, granted January 28, 1913, upon the application of Albert F. Staples and Harry J. Hick, of Alliance, Ohio, for an improvement in "Filing Appliances," an error appears in the printed specification requiring correction as follows: Page 2, line 41, strike out the word "shown"; and that the said Letters Patent should be read with this correction therein that the same may conform to the record of the case in the Patent Office.

Signed and sealed this 25th day of February, A. D., 1913.

[SEAL.]

C. C. BILLINGS,
*Acting Commissioner of Patents.*